United States Patent [19]

Johnson

[11] Patent Number: 5,463,280
[45] Date of Patent: Oct. 31, 1995

[54] LIGHT EMITTING DIODE RETROFIT LAMP

[75] Inventor: James C. Johnson, Conyers, Ga.

[73] Assignee: National Service Industries, Inc., Atlanta, Ga.

[21] Appl. No.: 206,594

[22] Filed: Mar. 3, 1994

[51] Int. Cl.⁶ .................................................... H05B 37/02
[52] U.S. Cl. ........................ 315/187; 362/800; 315/294; 315/324; 315/291
[58] Field of Search ..................... 362/800, 249, 362/252, 227, 234; 315/250, 324, 185 R, 185 S, 192, 188, 187, 193, 307, 291, 209 R, 224, 294, 310; 379/396

[56] References Cited

U.S. PATENT DOCUMENTS

| 3,795,830 | 3/1974 | Richardson | 362/800 |
| 4,271,408 | 6/1981 | Teshima et al. | 362/800 |
| 4,329,625 | 5/1982 | Nishizawa et al. | 362/800 |
| 4,711,955 | 7/1980 | Ray | 315/185 R |
| 4,727,289 | 2/1988 | Uchida | 315/185 R |
| 4,736,138 | 4/1988 | Masaki | 315/310 |
| 4,939,426 | 7/1990 | Menard et al. | 315/185 R |
| 4,963,798 | 10/1990 | McDermott | 315/192 |
| 5,012,157 | 4/1991 | Walton et al. | 315/192 |
| 5,155,669 | 10/1992 | Yamuro | 362/800 |

FOREIGN PATENT DOCUMENTS 0200773  6/1983  German Dem. Rep. ............. 379/396

Primary Examiner—Robert J. Pascal
Assistant Examiner—Michael Shingleton
Attorney, Agent, or Firm—Kenneth E. Darnell

[57] ABSTRACT

A retrofittable lamp using light emitting diodes as the illumination source, the lamp is fitted with any one of the common lamp bases and is intended as a retrofit for incandescent lamps having such bases in illuminated signs such as exit signs and the like. The invention contemplates the packaging of a number of light emitting diodes in a circuit usually having a current limiting device to allow LED operation at a desired current level. The light emitting diodes are placed within a standard glass or plastic bulb envelope in arrangements capable of providing even illumination from the lamp.

8 Claims, 4 Drawing Sheets

LIGHT EMITTING DIODE RETROFIT LAMP

BACKGROUND OF THE INVENTION

1. Field of the Invention

The invention relates generally to retrofittable lamps configured as standard incandescent lamps but with LED illumination soruces, the lamps of the invention being capable of substitution in illuminated signs such as exit signs and the like for previously used incandescent lamps.

2. Description of the Prior Art

It is estimated that approximately 40 million illuminated exit signs exist in operating capacities in this country at the present time. The great majority of this exit signage have as the illumination source one or more incandescent lamps. Millions of other illuminated signs also use incandescent lamps as the light source. While the incandescent lamps used in these illuminated signs have an exceptionally long life for incandescent lamps, a problem which exists with these lamps is the fact that the lamps burn out over time and must be replaced. Replacement of a burned out incandescent lamp in an illuminated sign with an essentially identical incandescent lamp is the common practice even though the necessity for replacement will again exist within a relatively short time even when the incandescent lamps are operated through a transformer at a reduced voltage in order to gain a longer lamp life. This basic problem has previously been recognized inter alia by Walton et al in U.S. Pat. Nos. 4,782,429 and 5,012,157, these patents describing lamps useful for replacement of incandescent lamps in exit signage and the like by the provision of low voltage, heated filament lamps which are intended to operate for a longer period of time than the incandescent lamps which have long been used in exit signage.

While illuminated signs have been proposed for a number of years with light emitting diodes as the illumination source, the use of light emitting diodes in original equipment exit signs has been expensive and, as importantly, the prior reliability of light emitting diodes has caused these illuminated signs to be less than practical. In recent years, light emitting diodes have improved to the point that such diodes have come into use as the original illumination source in certain categories of exit signage and the like. While the expense inherent in the use of light emitting diodes as the illumination source in an exit sign is still substantially greater than exit signs having incandescent or fluorescent illumination sources, the ability of the LED illumination source to provide extremely long life and energy efficiency has caused acceptance of LED-illuminated exit signs in the marketplace. Coincidental with the acceptance of LED-illuminated original equipment exit signage has been the provision of LED illumination sources in association with standard incandescent lamp bases to the end that the "solid state" or LED lamp so provided can be used in existing standard AC or DC lamp sockets. Ray, in U.S. Pat. No. 4,211,955, disposes light emitting diodes within a standard incandescent light bulb and lamp base. The solid state lamp thus provided by Ray can be used to replace any standard incandescent light bulb and inserted into existing standard AC or DC lamp sockets depending upon the standard base chosen. The circuitry of Ray includes an integrated circuit chip as a major portion of the operating circuit described in this patent. Uchida, in U.S. Pat. No. 4,727,289, disposes light emitting diodes on a printed circuitboard arranged inside a glass bulb having a base intended to be received into a standard socket. Power resistors used by Uchida are part of circuitry intended to provide a "high voltage" lamp but which also provides dissipative characteristics due to the wire-wound construction of the power resistors. In U.S. Pat. No. 4,939,427, Menard et al describe a lamp utilizing light emitting diodes as the illumination source, the lamp being insertable through a conventional base into a socket powered by an AC input. Other patents exist which utilize light emitting diodes as an illumination source whether with or without a covering envelope but with a base form intended to be received within a socket through which the LED illumination source is powered. Such patents include U.S. Pat. No. 4,290,095 to Schmidt, U.S. Pat. No. 4,630,183 to Fujita; U.S. Pat. No. 5,160,200 to Cheselske and U.S. Pat. No. 3,795,830 to Richardson. The disclosures of all of the patents mentioned hereinabove are incorporated hereinto by reference.

In view of the prior art described above, certain significant benefits are to be derived from a series connection of a significant number of light emitting diodes in arrangements proposed according to the present invention. The present circuit arrangements include attendant reduction of losses and stresses on circuit components. The invention thus provides LED illumination sources contained within a conventional glass or plastic bulb-like envelope of standard shape and dimensions and associated with common lamp bases such as intermediate, medium candelabra and double contact bayonet inter alia, such that the LED lamp of the invention can be retrofitted into existing exit signage which use incandescent lamps fitted with the corresponding lamp base.

SUMMARY OF THE INVENTION

The invention provides a retrofittable lamp having LED illumination sources packaged within a bulb envelope fitted with a common lamp base, the resulting lamp fitting into an incandescent socket and operable at line voltage in an illuminated sign such as an exit sign or the like. The illumination sources of the present retrofittable lamps primarily include light emitting diodes having a current limiting device in the circuitry. In at least certain embodiments of the invention, AC line voltage is converted to direct current. In the various embodiments of the invention, light emitting diodes are placed in series. In "high voltage" embodiments, a single resistor can function as a current limiting device with relatively larger numbers of light emitting diodes being used so that less voltage is applied across the resistor. In those embodiments of the invention wherein the current limiting device constitutes a capacitor, relatively few light emitting diodes can provide adequate illumination without excessive dissipative losses as heat.

The present LED lamps package all illumination sources and circuitry within the confines of a bulb envelope thereby eliminating the need for external circuitry or modifications to an installed exit sign. The several lamps of the invention simply screw or otherwise connect into the existing sockets within an installed exit sign. While the bulb envelope of the present LED lamps can conventionally be formed of glass, the interior of the bulb envelope would not require evacuation. Further, the bulb envelope could be formed of various plastic materials and could either be clear or frosted depending upon a desired affect.

Particular embodiments of the invention include the mounting of the light emitting diodes, connecting conductors and other circuit elements on boards whereby wire bonding techniques such as wave soldering allow connection of the light emitting diodes in series without significant failure rates. In a particular method of the invention, light emitting diodes and associated circuitry elements are wave soldered on a given side of two planar board elements which are then mounted "back-to-back" to allow the LED illumination sources to be directed in substantially all directions within the interior of the bulb envelope. Even illumination therefor results.

Accordingly, it is a primary object of the present invention to provide a retrofittable lamp utilizing light emitting diodes as the illumination source, the illumination source being fitted within a bulb envelope and base having the same size and shape of an incandescent lamp which the present LED lamp is intended to replace such as in an illuminated sign comprising an exit sign or the like.

It is another object of the invention to provide particularly efficient circuitry for retrofittable LED lamps capable of replacing previously used incandescent lamps in exit signage and the like.

A further object of the invention is to provide particular LED circuitry arrangements within the confines of a retrofittable lamp and socket and which are capable of providing even illumination.

Further objects and advantages of the invention will become more readily apparent in light of the following detailed description of the preferred embodiments.

DESCRIPTION OF THE PREFERRED EMBODIMENTS

Figure 1:
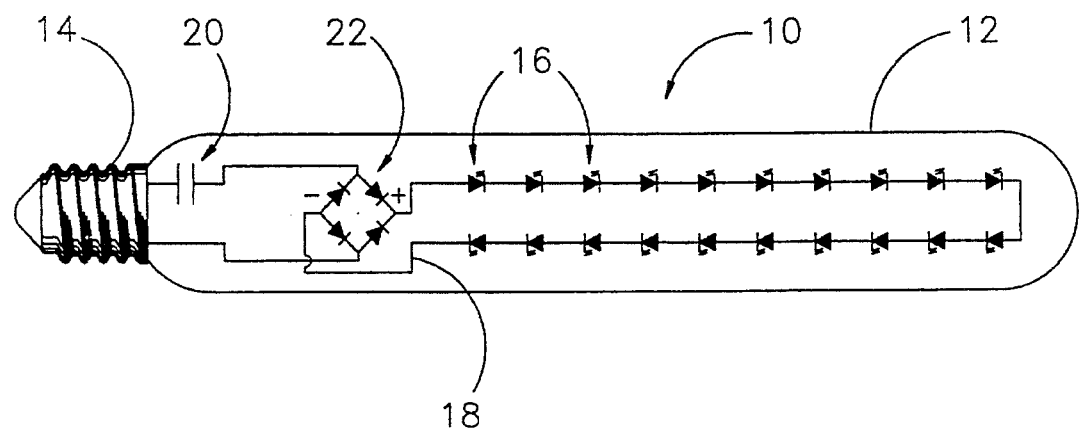
FIG. 1 is a side elevational view of a lamp according to the invention with interior circuitry shown schematically.

Referring now to the drawings and particularly to FIG. 1, a preferred embodiment of the invention is illustrated as comprising a lamp 10 having a lamp tube 12 and a base 14. While the lamps of the invention can be shaped and sized as desired to fit the exigencies of a particular use environment, the lamp 10 of FIG. 1 is particularly intended as a replacement lamp for an exit sign or similar illuminated sign which may have been originally fitted with an incandescent lamp. The lamp 10 of the invention is provided with a plurality of light emitting diodes 16 in series which fit within the lamp tube 12 and which form a part of a circuit 18 which includes the base 14 substantially in the manner that an incandescent filament in an incandescent lamp forms a part of a circuit which includes the base of the incandescent lamp. As such, the lamp 10 having the light emitting diodes 16 as its illumination source is capable of being used as a replacement lamp for a conventional incandescent lamp in an exit sign or illuminated sign. In the lamp 10, the interior of the lamp need not be evacuated since it is not necessary to operate the light emitting diodes 16 in a vacuum. Accordingly, the lamp tube 12 can be formed of glass or from other materials such as various "plastic" materials and the lamp tube 12 can be formed with one or more openings (not shown) as desired. The lamp tube 12 in the embodiment of FIG. 1 is shaped identically to the bulb conventionally known in the art as a T6½ bulb with the base 14 being that type of base known as an intermediate base. It is to be understood that common lamp bases known in the art as medium, candelabra, double contact bayonet, etc. can also be employed as a base such as the lamp base 14 depending upon the structure of the conventional lamp which the lamps of the present invention are intended to replace. While the lamp tube 12 could be formed in a different shape, it will be understood that the shaping and sizing of the lamp 10 to substantially identical dimensions as those of the lamp which is to be replaced facilitates use of the lamp 10 as a replacement. As can readily be seen, the lamp tube 12 functions as a protective cover which holds the light emitting diodes within a desired spatial envelope so that the diodes 16 remain in place in a use environment. All other elements of the circuit 18 are preferably disposed within the spatial volume defined by the lamp tube 12 for protection of the circuit elements and to prevent contact between any element of the circuit 18 and structure exterior to the lamp 10. Further, the lamp tube 12 acts to keep dust and the like from contacting either the diodes 16 or any part of the circuit 18 which might result in degradation of performance.

The lamp 10 would typically have a dimension of 5.5 inches in length in order to fit most incandescent lamp replacement situations in exit signage. The lamp 10 would further operate at a designed voltage of 120 volts which is the same voltage at which the incandescent lamp being replaced would operate within that socket (not shown) into which the base 14 connects to the line voltage. Voltages other than usual 120 VA can be employed. The lamp 10 has a design wattage of one watt, would have an operating temperature between −25° C. and +85° C. and a storage temperature between −25° C. and +100° C. The light emitting diodes 16 would be formed of conventional AlGaAs material and would operate at a peak wave length of 650 to 670 nm. Accordingly, the light emitting diodes 16 would preferably produce red light. The luminous intensity of each of the light emitting diodes 16 would be approximately 100 mcd at a minimum. As will best be seen relative to the following description of FIGS. 2 and 3, the light emitting diodes 16 are spaced as uniformly as possible within the interior of the lamp tube 12 in order to provide even illumination. While the lamp 10 can be provided with varying numbers of the light emitting diodes 16, very adequate illumination is provided by approximately 20 of the light emitting diodes 16 within the lamp 10 as shown in FIG. 1. It is possible to use fewer than twenty diodes 16 or even a greater number of the diodes 16 depending upon the illumination level required.

The preferred embodiment of the invention shown in FIG. 1 is seen to include a capacitor 20 in the circuit 18 with a diode bridge 22 being located between the capacitor 20 and the light emitting diodes 16. The capacitor 20 functions to limit current within the circuit 18 to the degree that the light emitting diodes 16 operate individually at approximately 0.02 amps. The capacitor 20 in the lamp 10 is preferably a 0.47 microfarad 120 AC device. The diode bridge 22 functions to convert AC line voltage to DC and provides full wave operation of the lamp 10. The circuit 18 is joined in essentially a conventional fashion to interior electrically conductive portions of the base 14 as is the case with a conventional incandescent lamp. It is preferred that the capacitor 20 and the diode bridge 22 are located as close to the base 14 as is reasonably possible.

Figure 4:
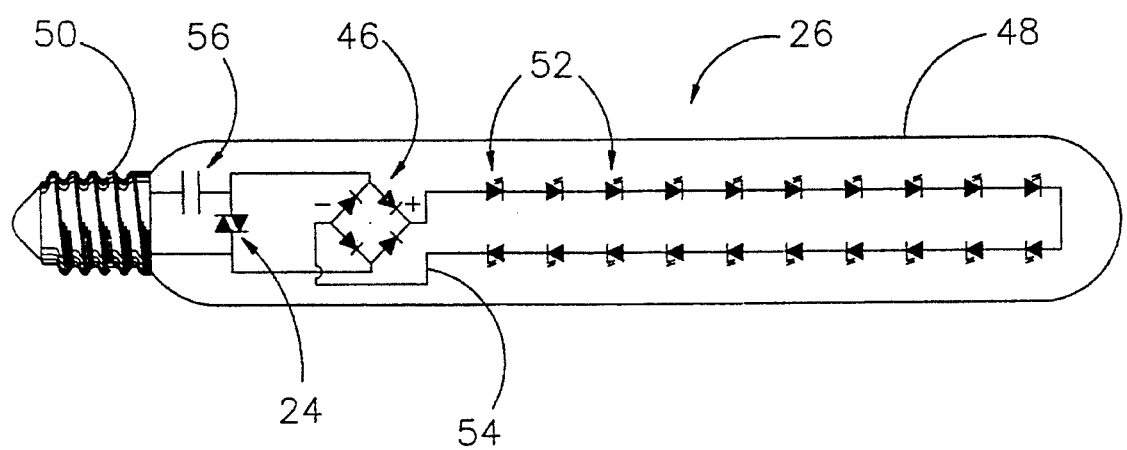
FIG. 4 is a side elevational view of a retrofittable lamp according to the invention schematically illustrating the circuitry of the lamp disposed interiorly thereof.

The embodiment of FIG. 1 can be configured as is shown in FIG. 4 with a varistor 24 such as an MOV as shown. The use of the varistor 24 is optional but does provide a surge-limiting function in circuit 54 of FIG. 4. While the embodiment of FIG. 4 is substantially identical to the embodiment of FIG. 1 with the exception of the addition of the varistor 24, the common elements between the two figures are identified by different numerical indicia. Accordingly, lamp 26 of FIG. 4 comprises lamp tube 48 and base 50 with the circuit 54 comprising light emitting diodes 52, a diode bridge 46 and a capacitor 56. Surge limiting devices such as the varistor 24 of FIG. 4 can be used in the circuitry of the other lamps described herein. Surge limiting devices are considered to be optional, however, since light emitting diodes do not have "negative resistance" characteristics such as do electrical discharge lighting devices and since such diodes do have at least some "positive slope" when considering the volt-amp characteristics of a typical light emitting diode. Accordingly, little current flows in a light emitting diode below certain threshhold levels. In essence, LED voltage increases dramatically with high current pulses and thus lessens a concern for off-line surges. Therefore, voltage sensing surge suppression devices such as the varistor 24 can be used for the additional protection thereby afforded.

Figure 2:
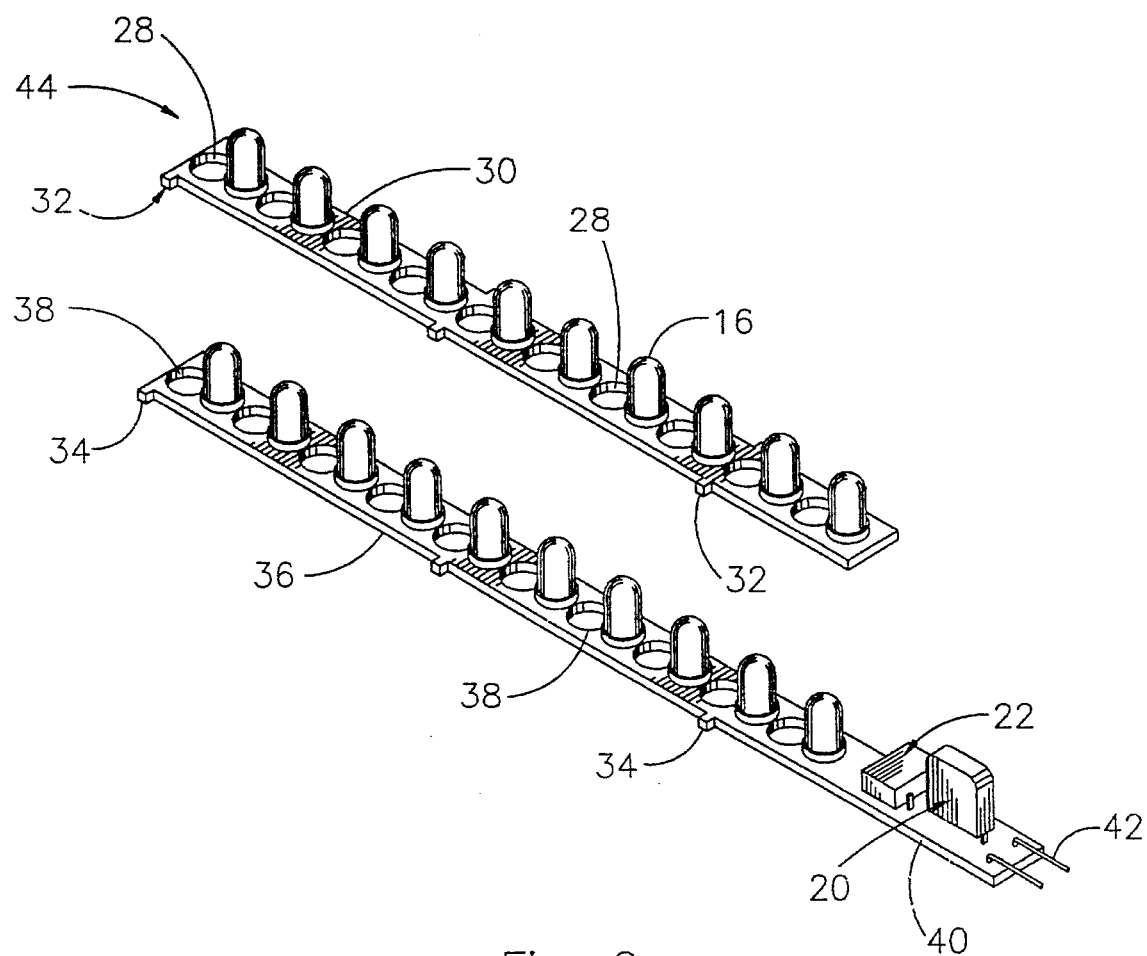
FIG. 2 is a perspective view of a particular arrangement of light emitting diodes soldered to substrate elements by wave soldering techniques.
Figure 3:
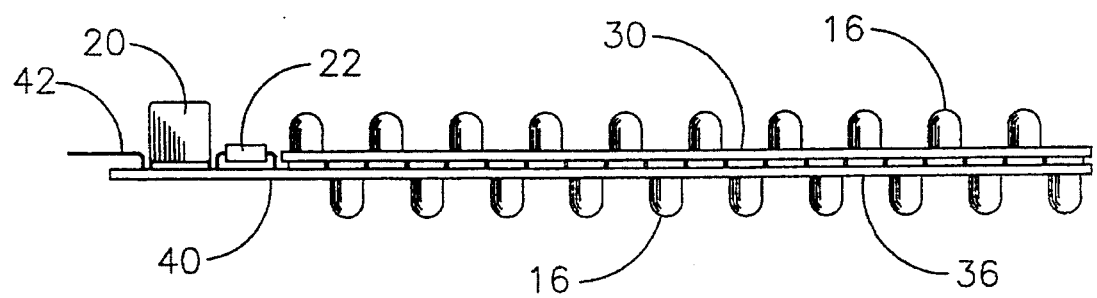
FIG. 3 is an assembly view of the structure shown in FIG. 2.

A particular arrangement of the light emitting diode 16 can be conveniently manufactured according to the invention as is shown in FIGS. 2 and 3 for use in the lamp 10 (or with lamp tubes and base structures of differing type). As is particularly seen in FIG. 2, the light emitting diodes 16 are spaced from each other and separated by a plurality of apertures 28 formed in an elongated circuit board substrate 30, all of the light emitting diodes 16 on the substrate 30 extending from one side thereof and being interconnected by soldered portions (not shown) of the circuit 18 on the opposite sides of the substrate 30 from which the diodes 16 extend. The substrate 30 is provided with web tabs 32 which are mated with corresponding tabs 34 on substrate 36 which also mounts a series of light emitting diodes 16 separated by apertures 38. While the tabs 32 and 34 hold the substrates 30 and 36 in a web of similar substrates during subsequent soldering, the tabs 32 and 34 also act to facilitate mounting of the assembled unit of FIG. 3 within the lamp tube 12. The substrate 36 is provided with an extended plate 40 formed integrally with the substrate 38 for mounting of the capacitor 20 and the diode bridge 22. Electrical contacts 42 extend from the end of the substrate 36 on which the capacitor 20 and diode bridge 22 are mounted. The contacts 42 connect (not shown in FIG. 2) with the base 14. The light emitting diodes 16 and the circuit 18 in which said diodes are connected are soldered while the substrates 30 and 36 are separate as is shown in FIG. 2 such as by wave soldering techniques which need not be described herein due to the conventional nature of the wave solder techniques per se. After wave soldering of the portions of the circuit 18 on those sides of the substrates 30 and 36 opposite the light emitting diodes 16, the substrates 30 and 36 are assembled together as is shown in FIG. 3 with the light emitting diodes 16 disposed on either of the substrates 30 and 36 extending through the apertures 28 or 38 on the other of said substrates. In other words, the substrates 30 and 36 are mounted essentially "front-to-front" with the light emitting diodes on either substrate extending outwardly from the rear surface of each substrate when said substrates are bonded together. In order to mate the two portions of the structure together, that end 44 of the substrate 30 is placed next to the diode bridge 22 with that aperture 28 disposed nearmost said end 44 receiving the diode 16 nearmost the diode bridge 22 on the substrate 36. Electrical connections (not shown) extend between the substrates 30 and 36 when assembled as seen in FIG. 3 to cause the diodes 16 and those circuit elements interconnecting the diodes 16 on the substrate 30 and 36 to electrically join all of the diodes 16. In this arrangement, the light emitting diodes 16 extend within the lamp tube 12 in two oppositely disposed directions and provide substantially even illumination from within the lamp 10. The structure of FIG. 3 will readily be understood to be inserted into the interior of the lamp tube 12 with the contacts 42 electrically connected to the base 14. Attachment of the lamp tube 12 to the base 14 provides a lamp 10 which is ready for connection into an appropriate socket as a replacement lamp in an exit sign or similar illuminated sign.

Figure 5:
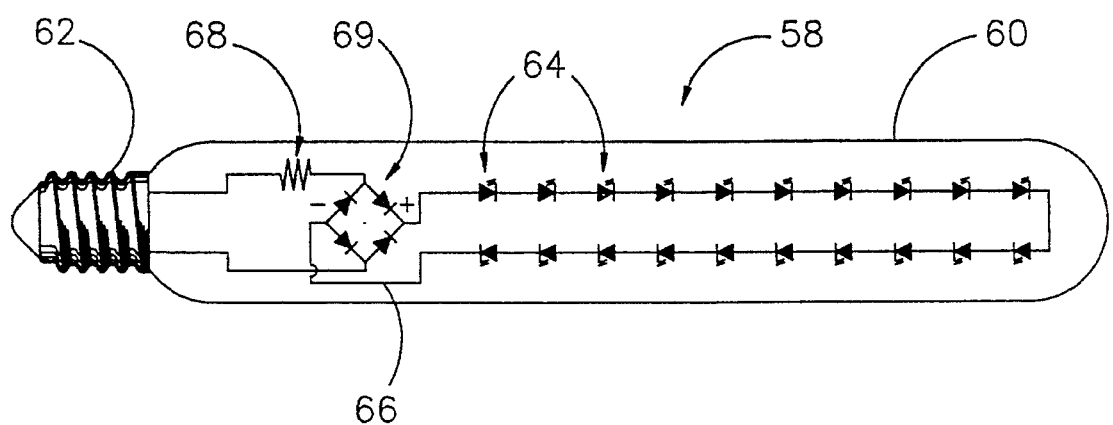
FIG. 5 is a side elevational view schematically illustrating a further embodiment of the invention.

Referring now to FIG. 5, an embodiment of the invention is seen to comprise lamp 58 having lamp tube 60 and base 62. A plurality of light emitting diodes 64 form a circuit 66 with a resistor 68. In the circuit 66, approximately 18 to 20 of the light emitting diodes 64 are connected in series with the resistor 68 which is chosen to be a 2200 ohm resistor. A diode bridge 69 is disposed in the circuit 66 between the resistor 68 and the light emitting diodes 64. Although twenty of the light emitting diodes 64 are shown in FIG. 5, a greater number of the diodes 64 can be employed. In essence, employment of greater numbers of light emitting diodes 64 causes the voltage seen across the resistor 68 to be reduced.

Figure 6:
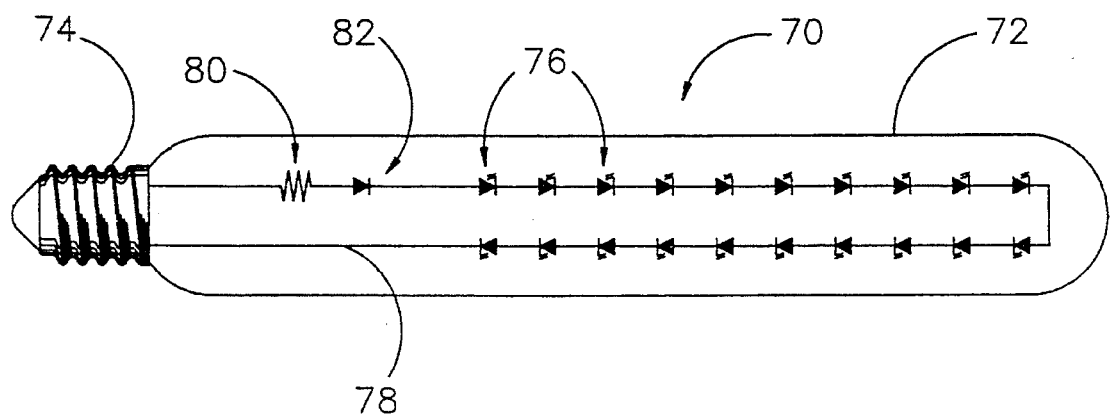
FIG. 6 is a side elevational view schematically illustrating yet another embodiment of the invention.

Referring now to FIG. 6, a unidirectional or half-wave embodiment of the invention is seen to comprise lamp 70 having lamp tube 72 and base 74. In this embodiment, approximately 18 to 20 light emitting diodes 76 are provided in series in circuit 78 which includes a 2200 ohm resistor 80 with a 1N4005 diode 82 being disposed in the circuit 78 between the resistor 80 and the light emitting diode 76. In the event an exit sign into which the lamp 70 is placed uses a 277 to 120 (or 90) volt transformer (not shown), the current imbalances could be of concern were it not for the fact that the lamp 70 utilizes only a small fraction of the power previously supplied for the incandescent lamp (not shown) which the lamp 70 replaces. In the embodiment of FIG. 6, the resistor 80 does not "see" a reverse voltage due to the provision of the diode 82 in the circuit 78.

Figure 7:
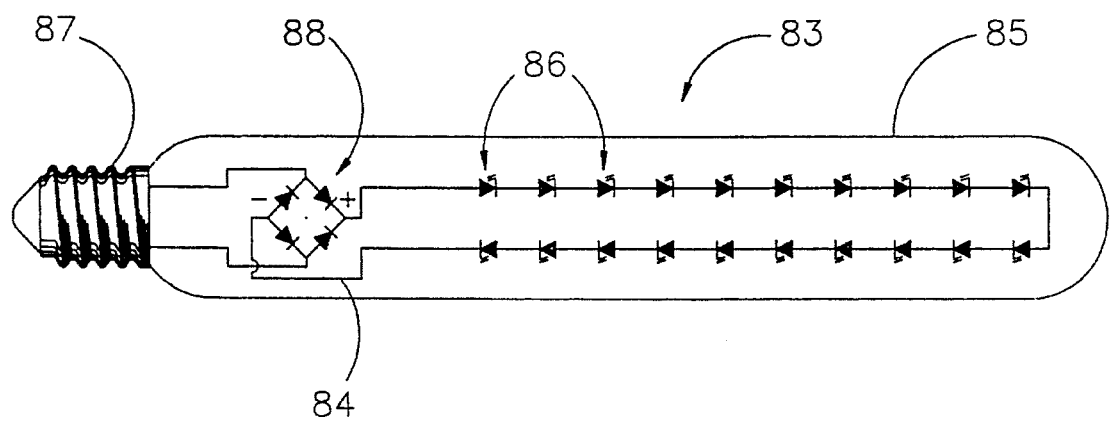
FIG. 7 is a diagrammatical illustration of a circuit according to the invention; and, FIGS. 8 through 10 are side elevational views of still further embodiments of the retrofittable lamp of the invention schematically illustrating the circuitry of the lamps.

Referring now to FIG. 7, a circuit 84 within lamp 83 is seen to contain light emitting diodes 86, the circuit 84 being capable of operating the diodes 86 without a series impedance. A diode bridge 88 is placed in the circuit 84 and allows the circuit 84 to function without a series impedance. It is possible to use "strings" of the diodes 86 arranged in parallel for the single "string" of the diodes 86 seen in FIG. 7. Such strings would typically include, e.g., as many as sixty-four of the light emitting diodes 86 with many multiples of the strings being potentially employed for redundancy. The diodes of the diode bridge 88 provide reverse polarity protection by means of the voltage blocking function which said diodes provide. A lamp having the circuit 84 would be able to take full advantage of the compounded affects of both a positive resistive slope and a quasi-pulsed form of operation for operating directly off-line.

Figure 8:
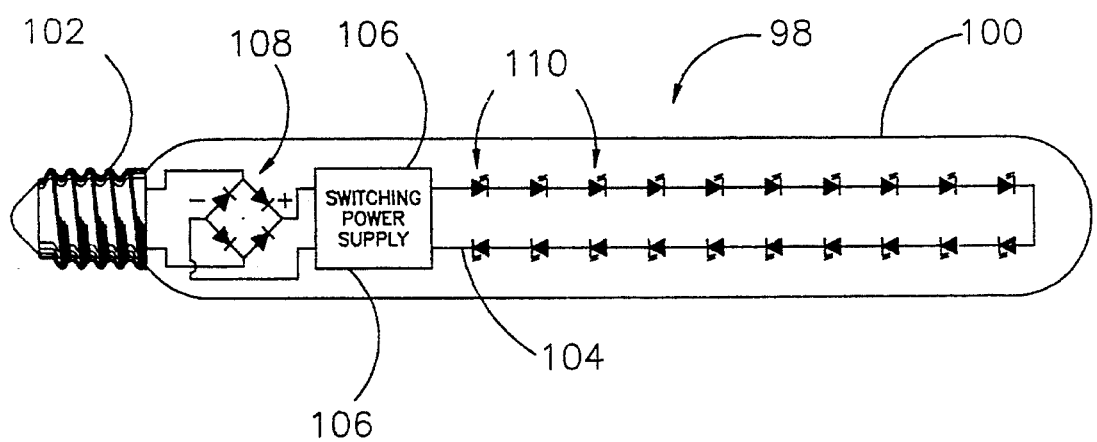

Referring now to FIG. 8, a lamp 98 configured according to yet another embodiment of the invention is seen to comprise a lamp tube 100 and a base 102. Circuit 104 includes light emitting diodes 110 and a diode bridge 108 with a switching power supply 106 disposed between the bridge 108 and the diodes 110. The switching power supply 106 can take the form of a power factor controller which would cause this embodiment of the invention to have a desirably high power factor. A power factor controller such as the D suffix (S0–8) device produced by Motorola and designated MC34261 is suitable in this circuitry.

Figure 9:
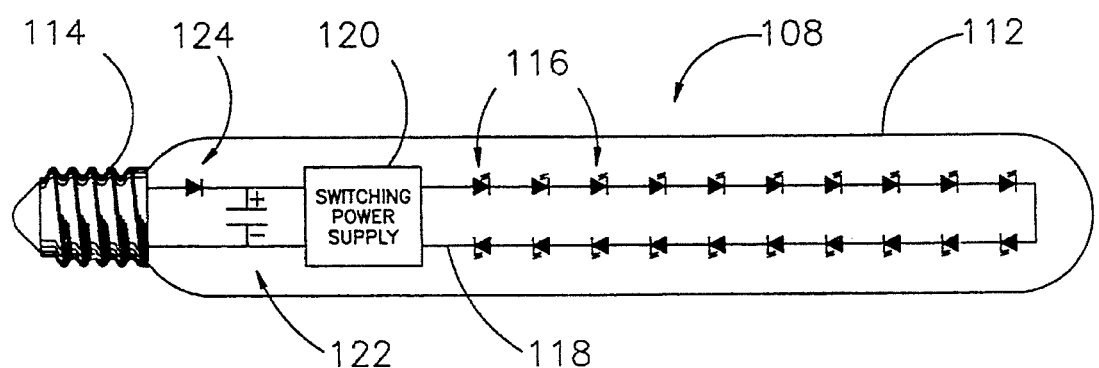

Referring now to FIG. 9, a lamp 108 configured according to a further embodiment of the invention is seen to comprise a lamp tube 112 and a base 114, a circuit 118 being contained within the lamp tube 112 and including electrically conductive portions of the base 114 in the circuitry for connection to line voltage or to any other appropriate voltage source. The circuit 118 contains in series a plurality of light emitting diodes 116 with a switching power supply 120 being contained in the circuit between the light emitting diodes 116 and a diode 124. A capacitor 122 is connected in parallel with the switching power supply 120. The switching power supply 120 can take the form of a power factor controller such as that device manufactured by Motorola and described hereinabove. The switching power supply 120 of FIG. 9 functions as a voltage reducing and current limiting device. The diode 124 functions as a reverse voltage blocking device and the capacitor 122 functions as a storage and smoothing device.

Figure 10:
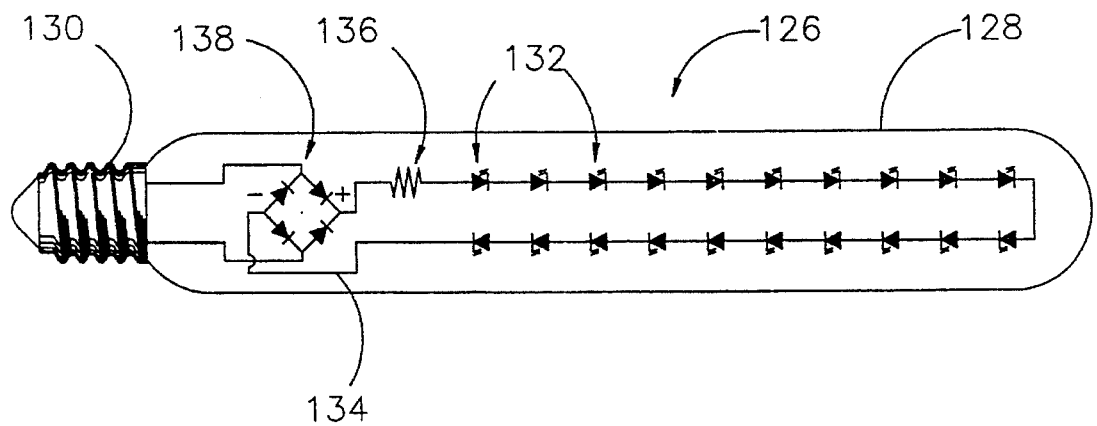

Referring now to FIG. 10, a lamp 126 is seen to comprise a lamp tube 128 and a base 130 with circuit 134 being substantially contained within the lamp tube 128. The circuit 134 includes a plurality of light emitting diodes 132 and a diode bridge 138 as shown. A resistor 136 is placed in series between the diode bridge 138 and the light emitting diodes 132. The resistor 136 functions as a current limiting device while the diode bridge 138 acts to convert alternating current to direct current.

The various lamps of the invention can be provided in a kit form with reflective material intended to enhance reflectivity and illumination performance within the use environment of an exit sign. The reflective material (not shown) can be backed with adhesive to allow appropriate mounting within the exit sign. Red V glow and separate color panels can also be provided in such a kit.

A primary advantage of the lamps of the present invention is that the lamps are self-contained and do not require installation other than simple placement of any one of the lamps into a socket (not shown) intended to receive an appropriate base of an incandescent lamp which is to be replaced by one of the present lamps. Accordingly, one of the present lamps is simply screwed into an existing incandescent lamp socket without a requirement for circuity changes or any positioning or securing of a light emitting diode assembly within the sign which is to be illuminated. It is further to be understood that the preferred embodiment typically would use less than a single watt and, therefore, in a two-lamp exit sign, would require less than two watts of power as compared to the use of approximately 17 watts for "long-life" luminaires using low-voltage incandescent filaments. The circuitry of the present lamps is also simplified by the operation of the light emitting diodes in a series arrangement. Use of the present lamps will not usually require a transformer and rectifier circuit in an illuminated sign, thereby obviating the cost and complexity of conventional low-voltage direct current lamps. It is further to be understood that the present concept can be utilized in illuminated signs wherein fluorescent lamps have previously been employed.

Given the teachings of the invention as provided herein, it can be readily understood that the lamps illustrating the several embodiments of the invention can be configured other than as expressly shown in the drawings and described hereinabove. In particular, differing bulb envelopes can be substituted for the lamp tubes such as are shown herein, the shape, size and even the existence of a bulb envelope being dependent upon the use environment. Further, the base for the lamps configured according to the invention can vary depending upon the requirements of a particular use situation. Accordingly, the invention can be practiced other than as described hereinabove with the scope of the invention therefore being limited only by the recitations of the appended claims.

What is claimed is:

1. A lamp capable of operation on standard line voltages and particularly useful as a replacement lamp in an emergency exit sign and the like, comprising:

a plurality of light emitting diodes arranged in series and comprising a circuit locatable within the spatial confines of the lamp;

means disposed in the circuit for limiting current through the light emitting diodes, said means comprising a capacitor acting as the only effective limiting impedance in the circuit; and, a diode bridge disposed in the circuit between the light emitting diodes and the capacitor.

2. The lamp of claim 1 wherein the circuit further comprises a varistor disposed in the circuit between the capacitor and the diode bridge to suppress current surges.

3. The lamp of claim 1 wherein the number of light emitting diodes in the circuit is approximately twenty.

4. A lamp capable of operation on standard line voltages and particularly useful as a replacement lamp in an emergency exit sign and the like, which exit sign is provided with at least one socket intended to receive a base of an exit sign lamp which is replaced by the present lamp, the present lamp having a base which can be received into the socket, comprising:

a plurality of light emitting diodes arranged in series and comprising a circuit locatable within the spatial confines of the lamp;

means disposed in the circuit for limiting current through the light emitting diodes, said means comprising a capacitor acting as the only effective limiting impedance in the circuit; and, means for rectifying current disposed in the circuit between the light emitting diodes and the capacitor.

5. The lamp of claim 4 wherein the rectifying means comprise a diode bridge.

6. The lamp of claim 5 wherein the number of light emitting diodes in the circuit is approximately twenty.

7. A lamp capable of operation on standard line voltages and particularly useful as a replacement lamp in an emergency sign and the like, comprising:

a plurality of light emitting diodes arranged in series and comprising a circuit locatable within the spatial confines of the lamp;

a single circuit element arranged in the circuit for limiting current through the light emitting diodes, the single circuit element comprising the only effective limiting impedance in the circuit and comprising a capacitor; and, a diode bridge disposed within the circuit between the light emitting diodes and the single circuit element.

8. A lamp capable of operation on standard line voltages and particularly useful as a replacement lamp in an emergency sign and the like, comprising:

a plurality of light emitting diodes arranged in series and comprising a circuit locatable wtihin the spatial confines of the lamp;

a single circuit element arranged in the circuit for limiting current through the light emitting diodes, the single circuit element comprising the only effective limiting impedance in the circuit; and, a diode bridge disposed within the circuit between the light emitting diodes and the single circuit element, the single circuit element comprising a capacitor.

* * * * *